(12) United States Patent
Wernberg et al.

(10) Patent No.: US 12,030,545 B2
(45) Date of Patent: Jul. 9, 2024

(54) PULL AND TOW UTILITY TRAILER

(71) Applicant: Tricam Industries, Inc., Eden Prairie, MN (US)

(72) Inventors: Benjamin M. Wernberg, Savage, MN (US); Benjamin P. Williams, Chaska, MN (US); Joseph P. Foley, St. Paul, MN (US)

(73) Assignee: Tricam Industries, Inc., Eden Prairie, MN (US)

( * ) Notice: Subject to any disclaimer, the term of this patent is extended or adjusted under 35 U.S.C. 154(b) by 141 days.

(21) Appl. No.: 17/683,017

(22) Filed: Feb. 28, 2022

(65) Prior Publication Data
US 2022/0306179 A1    Sep. 29, 2022

Related U.S. Application Data
(60) Provisional application No. 63/154,011, filed on Feb. 26, 2021.

(51) Int. Cl.
*B62B 5/06* (2006.01)
*B62B 1/00* (2006.01)
*B62B 1/24* (2006.01)

(52) U.S. Cl.
CPC ............ *B62B 5/066* (2013.01); *B62B 1/008* (2013.01); *B62B 1/24* (2013.01); *B62B 5/067* (2013.01)

(58) Field of Classification Search
CPC ........... B62B 5/066; B62B 5/06; B62B 5/064; B62B 5/065; B62B 5/067; B62B 5/069; B60D 1/54; B60D 1/145; B60D 1/155; B60D 1/66; B60D 1/58
See application file for complete search history.

(56) References Cited

U.S. PATENT DOCUMENTS

| | | | | | |
|---|---|---|---|---|---|
| 2,725,242 | A | * | 11/1955 | Peplin | B62K 27/12 280/415.1 |
| 2,980,442 | A | * | 4/1961 | Krokos | B60D 1/00 280/502 |
| 3,833,263 | A | * | 9/1974 | Jackson | B60P 1/18 298/17.5 |
| 4,645,224 | A | * | 2/1987 | Poganski | B60D 1/14 280/475 |
| 4,711,499 | A | * | 12/1987 | Fortin | B62D 63/062 298/20 R |
| 4,738,457 | A | * | 4/1988 | Conrad | B62B 5/06 280/204 |
| 4,789,171 | A | * | 12/1988 | Porter | B62B 5/06 280/47.26 |
| 4,887,836 | A | * | 12/1989 | Simjian | B62B 3/007 280/651 |
| 4,889,390 | A | * | 12/1989 | Campbell | B60P 1/12 298/20 R |
| 5,544,944 | A | * | 8/1996 | Keech | B60P 1/24 298/5 |

(Continued)

FOREIGN PATENT DOCUMENTS

| | | | | |
|---|---|---|---|---|
| CA | 2412458 A1 | * | 5/2003 | |
| CN | 105882697 A | * | 8/2016 | |
| EP | 3838710 A1 | * | 6/2021 | ............... B60D 1/54 |

*Primary Examiner* — Steve Clemmons (57) ABSTRACT

A utility trailer is disclosed. The trailer is a two-wheel trailer with rotating handle and yoke tube that locks to the chassis of the trailer in two positions. The trailer also includes two dump pivot points and a release lever mounted to the tub of the trailer.

20 Claims, 13 Drawing Sheets

(56) References Cited

U.S. PATENT DOCUMENTS

| | | | | |
|---|---|---|---|---|
| 5,941,585 A * | 8/1999 | McAlister, II | B60D 1/14 | |
| | | | 280/47.17 | |
| 6,290,301 B1 * | 9/2001 | Bockman | B60P 1/18 | |
| | | | 298/20 R | |
| 6,662,679 B2 * | 12/2003 | Hobdy | B60D 1/14 | |
| | | | 74/548 | |
| D502,305 S * | 2/2005 | Browder | D34/27 | |
| 6,851,756 B2 * | 2/2005 | Pieschel | B60P 1/04 | |
| | | | 298/17.8 | |
| 6,868,581 B2 * | 3/2005 | Browder | B62B 5/06 | |
| | | | 16/446 | |
| 6,962,370 B2 * | 11/2005 | Simpson | B62D 63/061 | |
| | | | 280/789 | |
| 7,134,681 B1 * | 11/2006 | Jones | B62B 5/06 | |
| | | | 280/651 | |
| 7,210,697 B2 * | 5/2007 | Simpson | B62B 5/06 | |
| | | | 16/446 | |
| 7,350,799 B2 * | 4/2008 | Labadie | B60D 1/00 | |
| | | | 105/364 | |
| 7,441,792 B2 * | 10/2008 | Simpson | B62B 5/06 | |
| | | | 16/446 | |
| 7,887,141 B2 * | 2/2011 | Pieschel | B62B 3/08 | |
| | | | 298/17.8 | |
| 8,382,138 B2 * | 2/2013 | Carroll | B62B 5/0079 | |
| | | | 280/288.4 | |
| 8,998,341 B2 * | 4/2015 | Dechant | B60P 1/6409 | |
| | | | 298/5 | |
| 9,156,319 B1 * | 10/2015 | Kennemer | B60D 1/145 | |
| D819,917 S * | 6/2018 | Simpson | D34/12 | |
| 10,029,523 B2 * | 7/2018 | Pederson | B60D 1/025 | |
| D897,679 S * | 10/2020 | Foley | D3/304 | |
| D897,680 S * | 10/2020 | Foley | D3/304 | |
| 11,299,187 B2 * | 4/2022 | Foley | B62B 3/007 | |
| 11,505,020 B2 * | 11/2022 | Wernberg | B62B 5/0079 | |
| 2017/0267299 A1 * | 9/2017 | Nielsen | B60S 13/00 | |
| 2020/0247198 A1 * | 8/2020 | Wernberg | B62B 5/06 | |

* cited by examiner

ND TOW UTILITY TRAILER

PULL AND TOW UTILITY TRAILER

RELATED APPLICATION

The present application claims the benefit of U.S. Provisional Application No. 63/154,011, filed Feb. 26, 2021, which is hereby incorporated herein in its entirety by reference.

TECHNICAL FIELD

The present disclosure relates generally to portable utility carts trailers and more particularly to a rotating handle: and yoke tube that locks to the chassis of the trailer in two positions.

BACKGROUND

It is often desirable to transport cumbersome articles, through the use of a cart or wagon, from point A to point B that could not otherwise be easily transported by one or more individuals. Furthermore, it is desirable to transport and easily dump various types of particulate matter, such as dirt, loose gravel, and livestock feed as well as a multitude of other articles. Such a cart may function as a trailer towed behind a motorized vehicle, towed by a person, or self-propelled.

There are many forms of carts that have been used for carrying and dumping a variety of items. Many of which contain a relatively flat bed used to contain the articles in transit and a pivoting mechanism for slidably removing the articles from the bed to an alternate location.

Various mechanisms have been employed to transfer cumbersome cargo from the transport cart to another location. Manual unloading has been used. However, multitudes of pivoting mechanisms have been exploited to achieve the desired dumping. Placement of the pivot and the size of the dumping cart vary considerably throughout the prior art. Larger carts employ pneumatic cylinders and hydraulics to pivot the bed and allow for dumping of the articles transported.

It is common to attach a towed vehicle such as a trailer to a towing vehicle by use of a rigid member with an articulating connection at the points of attachment to the vehicles. Many methods are used for making the attachment. For example, heavy trailers are often connected with the pintle arrangement discussed in U.S. Pat. No. 5,941,585. Lighter trailers for highway use are often connected with a ball and hitch apparatus as shown U.S. Pat. No. 4,645,224.

For still lighter towed vehicles, however, the connection is often simpler. Light utility trailers for off-highway use, such as a trailer for a garden tractor for example, are often connected with a simple pin connection. For instance, the pin connection can take the form of a rigid tongue member connected at one end to the towed vehicle and having a hitch consisting of a clevis at the other end. The clevis has a hole or aperture through each branch of the clevis. The towing vehicle is provided with a projecting tab at its rear side also having a hole or aperture through it. When the clevis end of the tongue is mated with the tab projecting from the towing vehicle, the holes can be aligned and a pin inserted to couple the two vehicles.

Tight maneuvering, especially backing, of a towed vehicle while connected to the towing vehicle is often difficult. Also, it is sometimes desirable to move a towed vehicle in places where the towing vehicle cannot go. Accordingly, it is sometimes necessary to manually pull and maneuver a towed vehicle. The apparatus used for connecting the tongue of the towed vehicle to the towing vehicle, however, is normally not conducive to gripping with the human hand. For that reason, various apparatus have been designed over time to provide detachable handles for use with a tongue of a towed vehicle.

For pintle towed trailers, the handle described in U.S. Pat. No. 5,941,585 attaches to the pintle ring, allowing two persons to lift the tongue and maneuver the trailer. This device, however, is suitable only for pintle type connections.

For lighter trailers using a ball and hitch, the handle of U.S. Pat. No. 4,645,224 can be attached to the tongue member, allowing one or two persons to lift and maneuver the trailer. The spring-loaded, twist-locking arrangement of this apparatus, however, requires the tongue member to have a somewhat large cross-section to accommodate the apparatus. Towed vehicles light enough to use a pin-connection type hitch generally do not use a tongue having a large cross section. Accordingly, such a handle is usually not suitable for use with a lighter towed vehicle.

Dumping carts and hinging trailers are known, including those disclosed in U.S. Pat. No. 3,833,263 to Jackson; U.S. Pat. No. 4,711,499 to Fortin; U.S. Pat. No. 4,889,390 to Campbell; U.S. Pat. No. 5,395,163 to Mandell et al.; U.S. Pat. No. 5,544,944 to Keech; and U.S. Pat. No. 6,290,301 to Bockman, all of which are incorporated herein by reference. Improvements over these earlier patents include U.S. Pat. No. 6,662,679 to Hobdy et al.; U.S. Pat. No. 6,851,756 to Pieschel; U.S. Pat. No. 6,962,370 to Simpson; U.S. Pat. No. 7,175,205 to Simpson; U.S. Pat. No. 7,210,697 to Simpson; U.S. Pat. No. 7,390,065 to Pieschel et al.; U.S. Pat. No. 7,441,792 to Simpson; U.S. Pat. No. 7,818,865 to Pieschel et al.; U.S. Pat. No. 7,887,141 to Pieschel et al.; U.S. Pat. No. D819,917 to Simpson et al.; U.S. Pat. No. D826,507 to Wernberg et al., all of which are incorporated herein by reference.

A convertible handle of U.S. Pat. Nos. 7,210,697 and 7,441,792 utilizes rotatable handle and tongue portions that allow a user to switch from manually pulling a trailer to attaching a trailer to a towing vehicle. While such a handle addressed the need to switch between manual and powered movement of a trailer, the device was bulky, heavy, complex to manufacture, and was comprised of several parts. U.S. Patent Publication 20200247198 discloses a convertible handle that enables a cart or wagon to be pulled manually or towed by attachment to a vehicle with a grip that slides along the shaft of the handle to expose a connection for towing.

What is needed in the industry is a trailer with a convertible handle that readily converts from a graspable handle for manual pulling by a user ready coupling to a powered vehicle such as a lawn tractor or an ATV that also provides the benefit of locking to the chassis of the trailer in multiple positions that also allows for dual dump pivot points and a release lever that is mounted on the tub of the trailer instead of the chassis.

The desirable elements of the present invention are neither taught nor disclosed in the prior art. The present invention is therefore a useful improvement upon the prior art of record.

SUMMARY

The present invention substantially meets the aforementioned needs of the industry. The utility trailer includes a handle that is readily convertible from a disposition presenting a handle, preferably with a grip, that may be readily grasped by a user for manually pulling the utility trailer to a disposition presenting a tongue for the ready coupling of the utility trailer to a vehicle. Such a convertible handle greatly enhances the utility of the trailer as compared to known methods, being both readily manually and vehicle towed, as desired. Additionally, there are only a few components that enable both manual and vehicle towing with no component requiring separate storage in either of the towing configurations while significantly reducing the complexity and cost of manufacturing.

The present invention is a convertible handle having a grip portion; the grip portion is axially slideable along the shaft of the convertible handle from a first end towards a second end. The grip portion can be locked at the first end to allow for manual pulling of the utility trailer attached at the second end. When the grip portion is unlocked from the first end, it can be slid toward the second end, exposing a tongue that can be connected to a towing vehicle while the grip portion remains on the shaft.

The present invention further allows the convertible handle to be placed in a position that allows the utility trailer to stand on an end of the handle to keep the utility trailer in a carrying position. Another novel aspect of the present invention is a tub release mechanism that allows the tub to pivot on the chassis of the utility trailer that is more readily accessible by being mounted to the tub instead of the chassis.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Referring to FIGS. 1-5, a utility trailer of the present invention is generally designated in the drawings by reference numeral 100. The utility trailer includes a tub 200, a chassis 300, a handle 400, a pair of wheels 500, and a tub locking mechanism 600. In the embodiment depicted in FIGS. 1-5, the handle 400 comprises a shaft 410 and a grip 420. The grip 420 is slideable along the longitudinal axis 413 (see FIG. 3) of the shaft 410. The grip 420 has a handle 421 and a hub 422, through which is a grip shaft aperture 423. The grip 420 is preferably transverse to the shaft 410 and is substantially straight to provide comfort to a person manually pulling the utility trailer 100.

Figure 14:
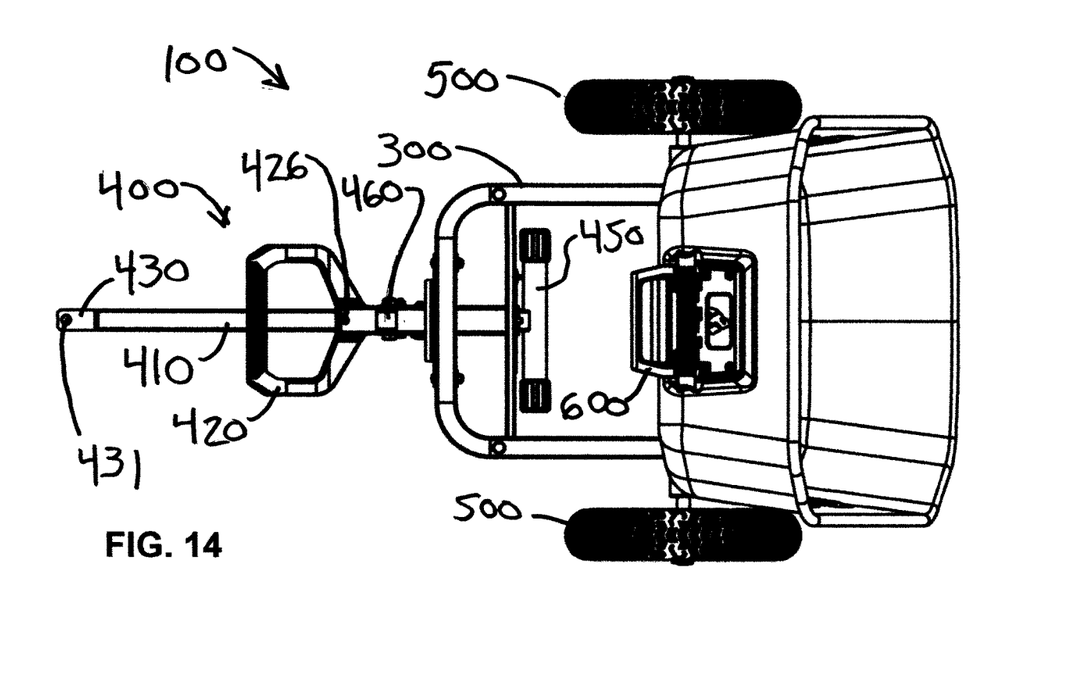
FIG. 14 depicts a top plan view of an embodiment of the utility trailer in the tow and dump configurations.
Figure 15:
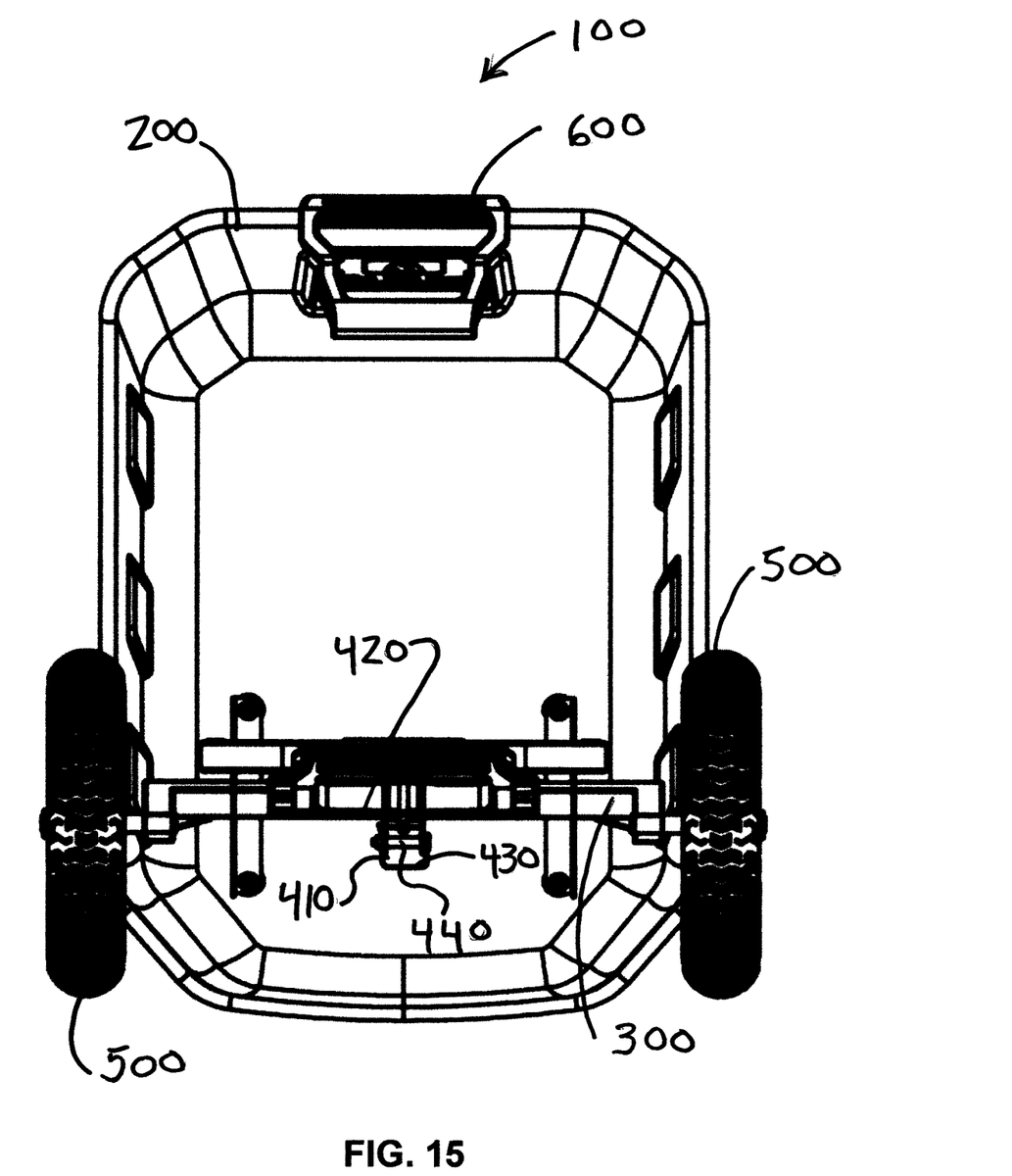
FIG. 15 depicts a front elevation view of an embodiment of the utility trailer in the tow and dump configurations.

When in the configuration shown in FIGS. 1-5, the handle 400 allows a user to manually pull the utility trailer 100 by taking hold of the grip 420 that is located in this configuration at the shaft first end 411 while the handle 400 is connected to the utility trailer 100 at the shaft second end 412. The grip 420 is retained in the shown configuration via an attachment pin 440 that is installed through grip attachment pin holes 426 aligned with tongue attachment pin holes 431 (see FIG. 14). The attachment pin 440 may be any of those common in the art, such as a t-pin, a ball lock pin, a hitch pin with cotter pin, an outrigger pin, or the like.

Figure 13:
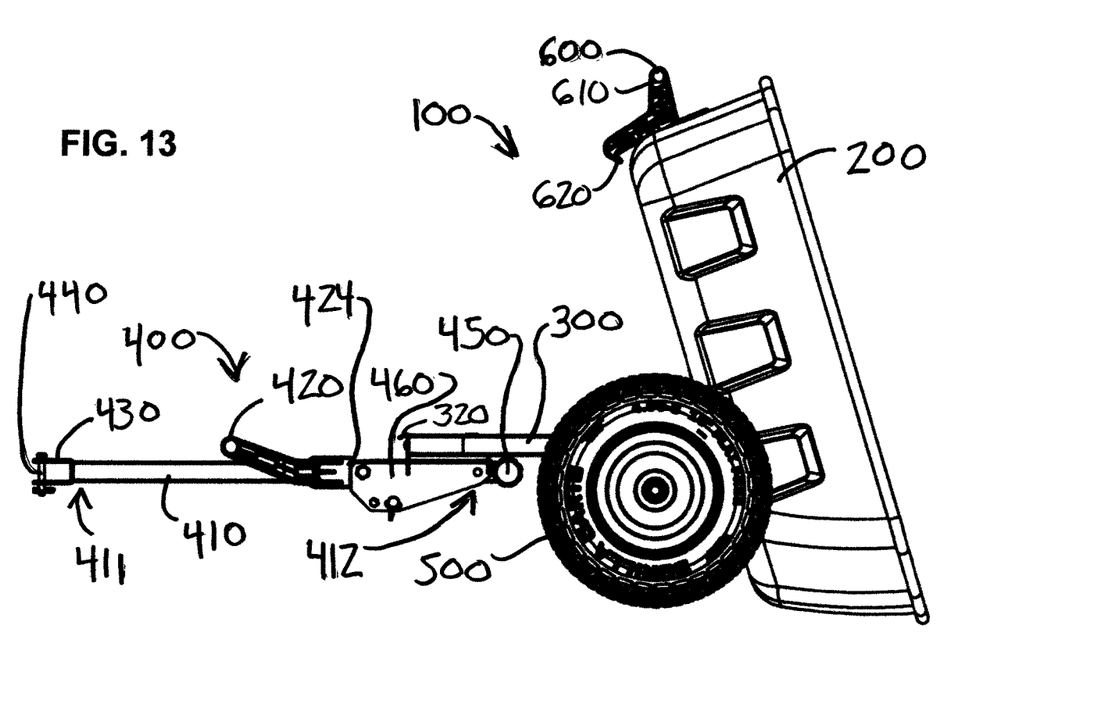
FIG. 13 depicts a right side elevation view of an embodiment of the utility trailer in the tow and dump configurations.

The grip shaft aperture 423 is sized to accommodate the outer perimeter of both the tongue 430 and shaft 410 (i.e., the grip shaft aperture inner perimeter 423 (see FIG. 13) is larger than the shaft outer perimeter 424 (FIG. 21) and the tongue outer perimeter 432 (FIG. 22)). The shaft outer perimeter 424 and tongue outer perimeter 432 may be identical and closer to the grip shaft aperture inner perimeter 424 to keep the grip 420 from freely moving. Alternatively, the shaft outer perimeter 414 may be smaller than the tongue outer perimeter 432 to allow the grip 420 to move freely along the shaft 410. In this arrangement, the shaft second end 412 is attached to the utility trailer 100.

Figure 1:
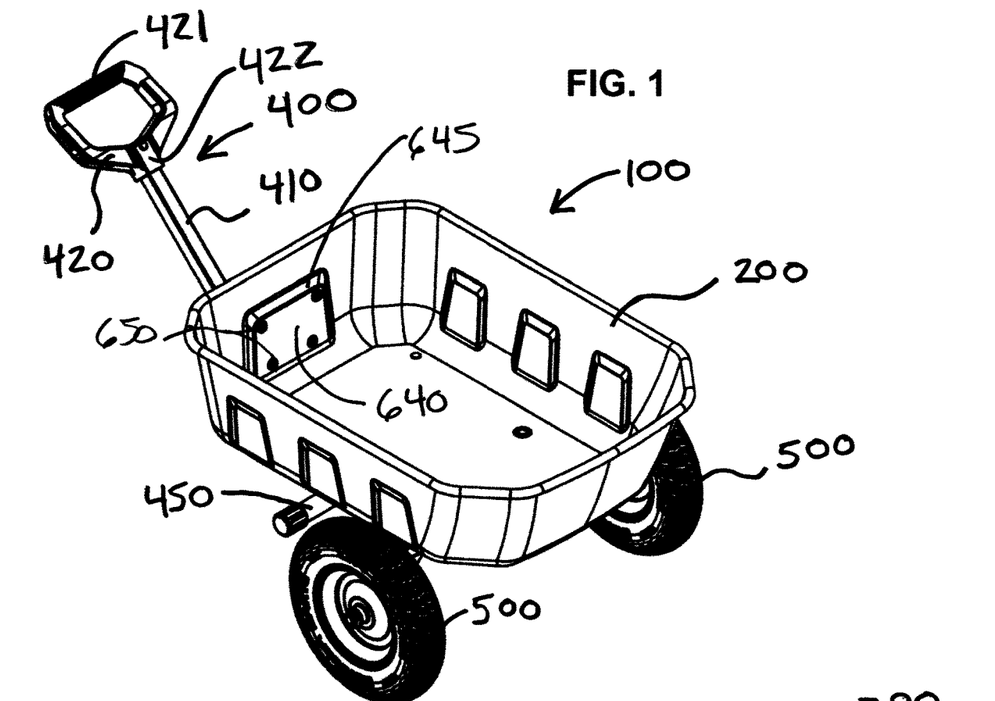
FIG. 1 depicts a perspective view of an embodiment of the utility trailer in the pull configuration.
Figure 2:
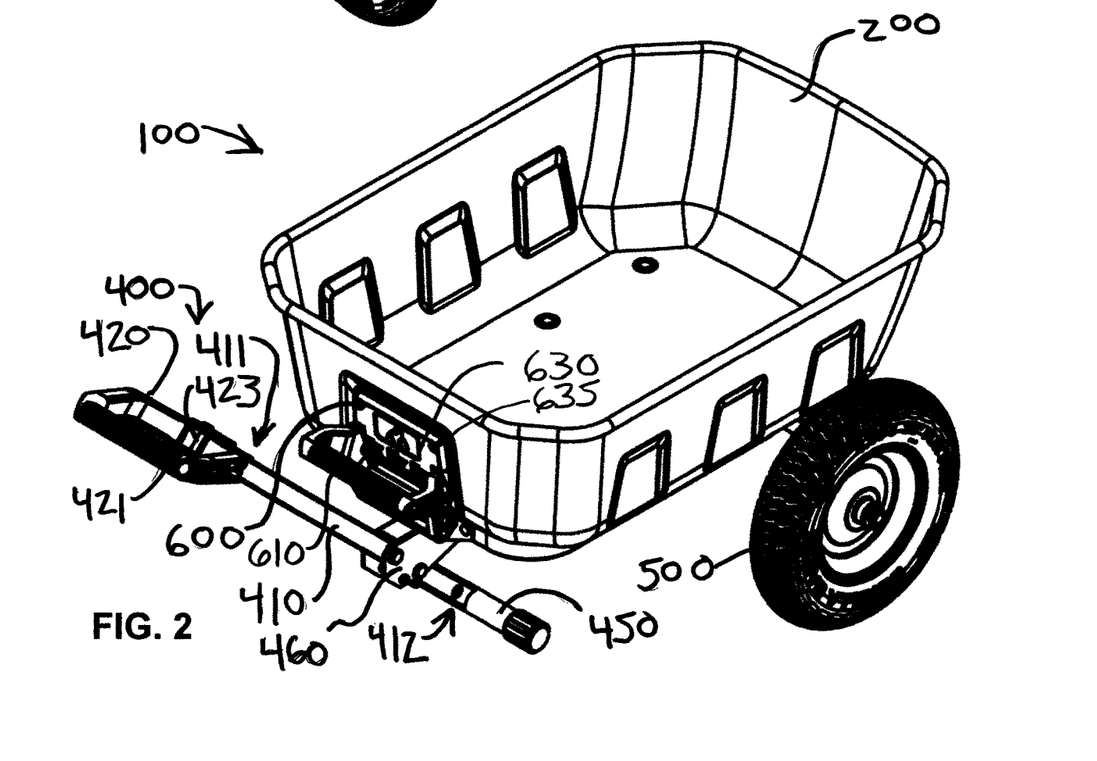
FIG. 2 depicts a second perspective view of an embodiment of the utility trailer in the pull configuration.
Figure 3:
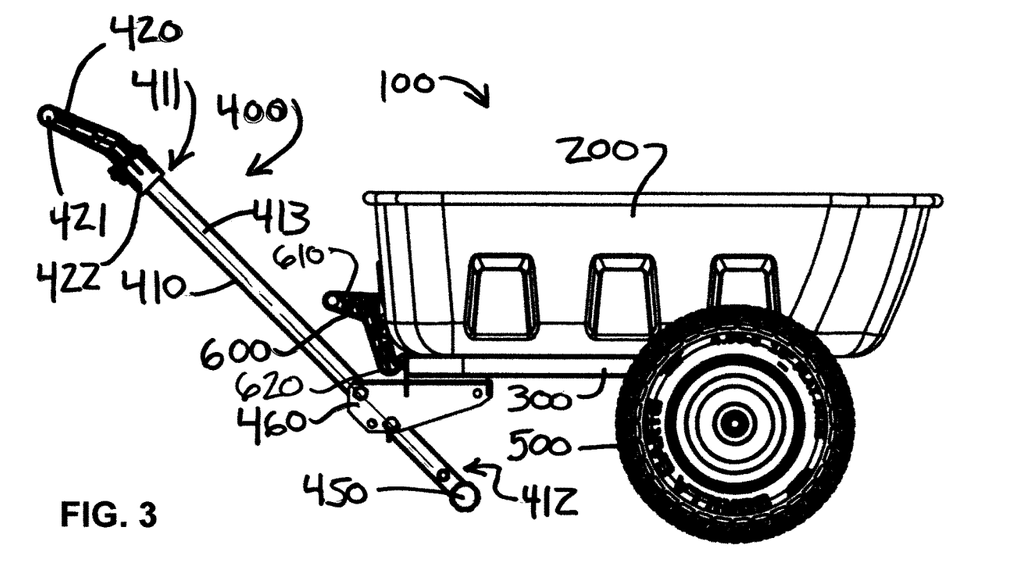
FIG. 3 depicts a right side elevation view of an embodiment of the utility trailer in the pull configuration.
Figure 4:
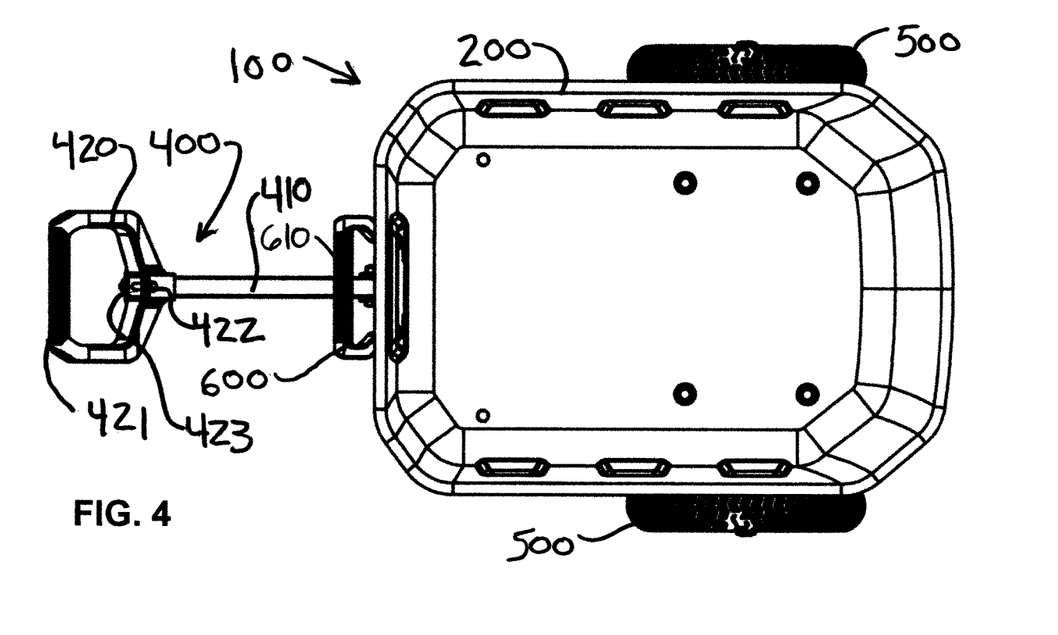
FIG. 4 depicts a top plan view of an embodiment of the utility trailer in the pull configuration.
Figure 5:
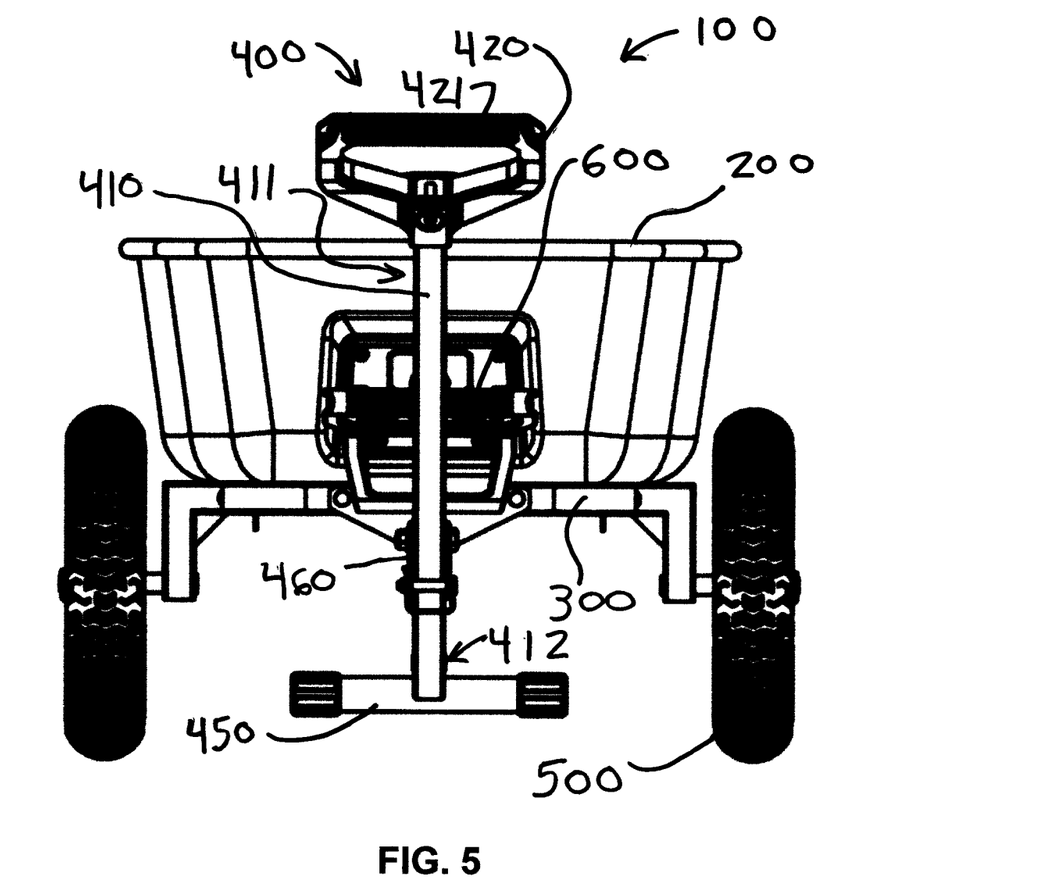
FIG. 5 depicts a front elevation view of an embodiment of the utility trailer in the pull configuration.
Figure 6:
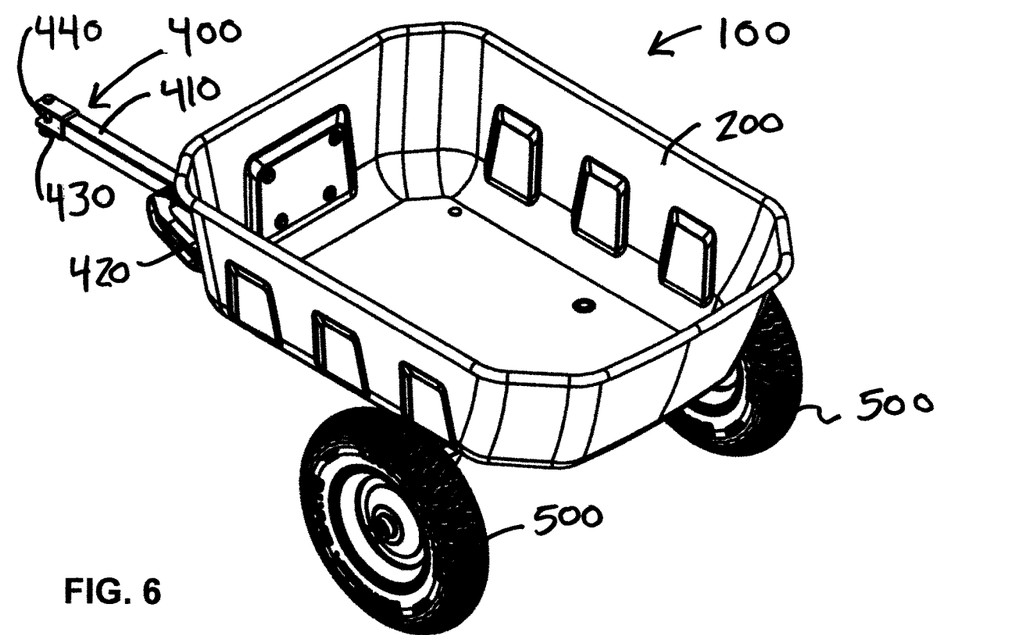
FIG. 6 depicts a perspective view of an embodiment of the utility trailer in the tow configuration.
Figure 7:
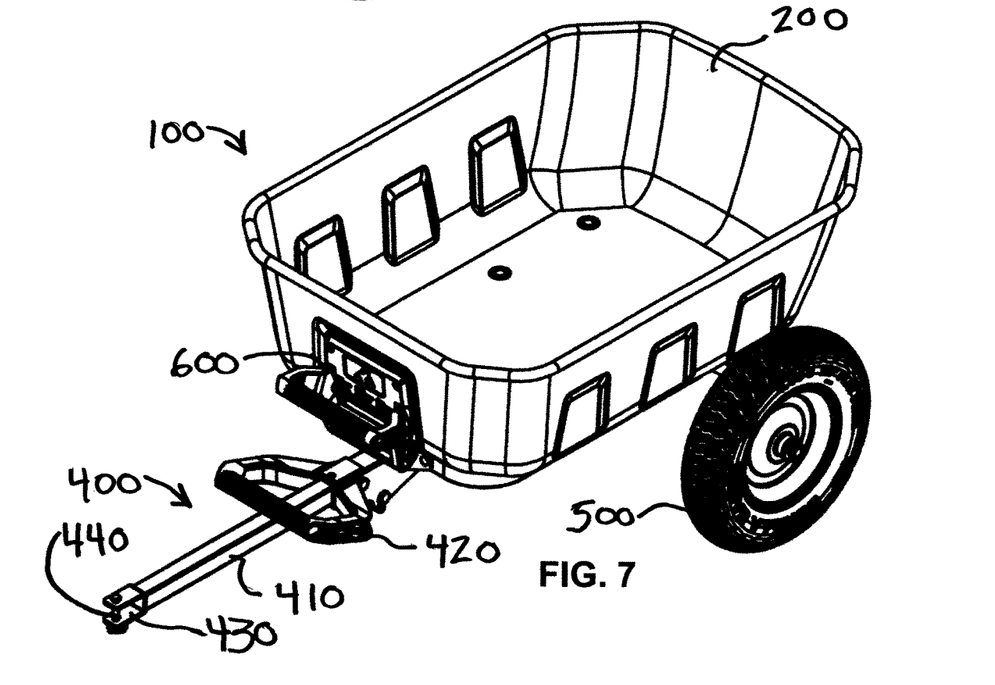
FIG. 7 depicts a second perspective view of an embodiment of the utility trailer in the tow configuration.
Figure 8:
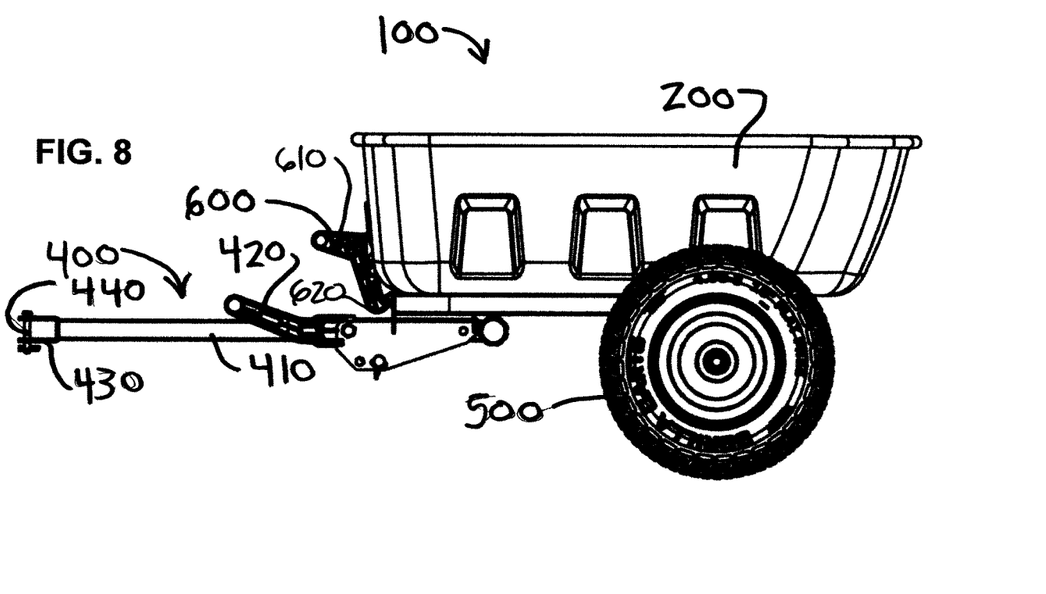
FIG. 8 depicts a right side elevation view of an embodiment of the utility trailer in the tow configuration.
Figure 9:
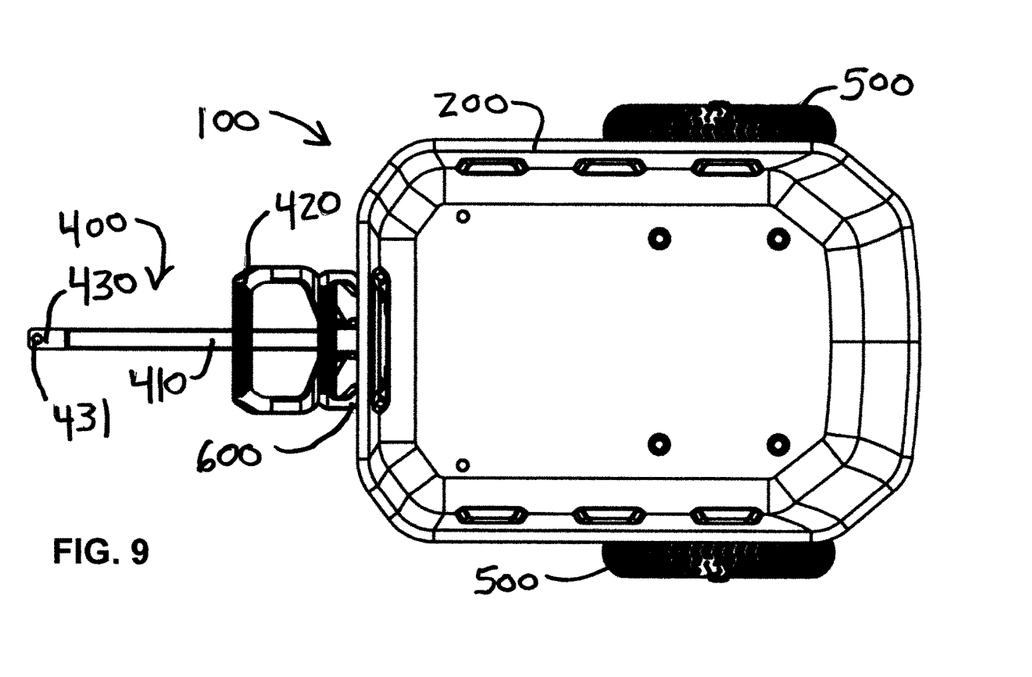
FIG. 9 depicts a top plan view of an embodiment of the utility trailer in the tow configuration.
Figure 10:
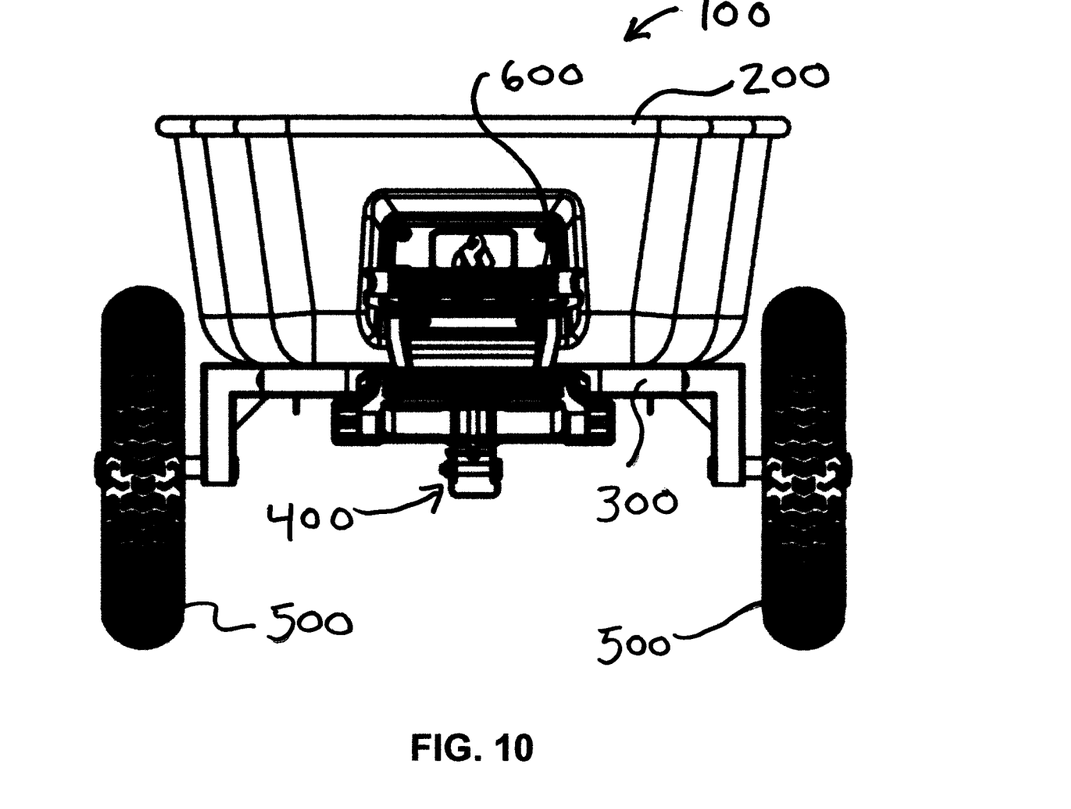
FIG. 10 depicts a front elevation view of an embodiment of the utility trailer in the tow configuration.
Figure 11:
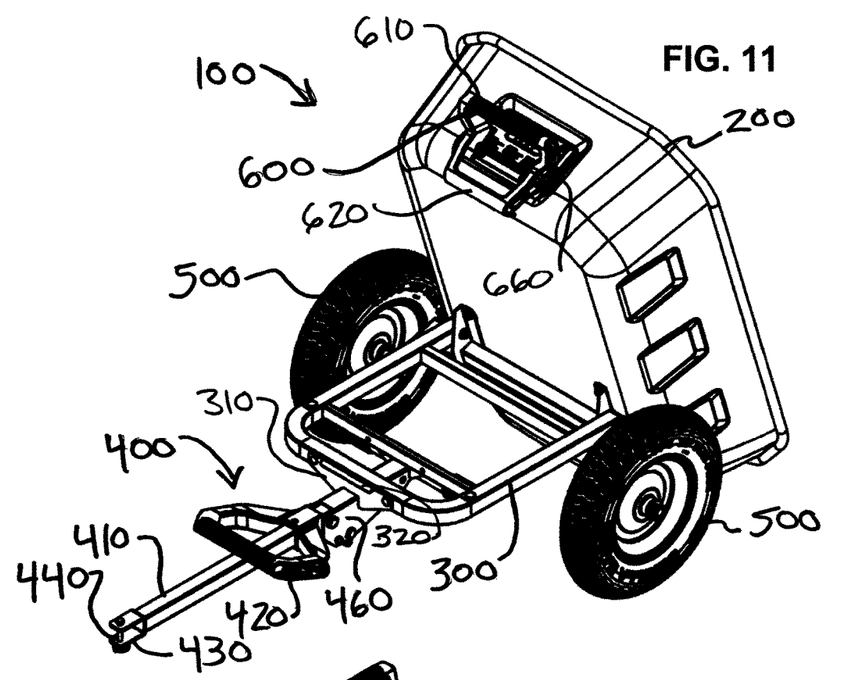
FIG. 11 depicts a perspective view of an embodiment of the utility trailer in the tow and dump configurations.
Figure 12:
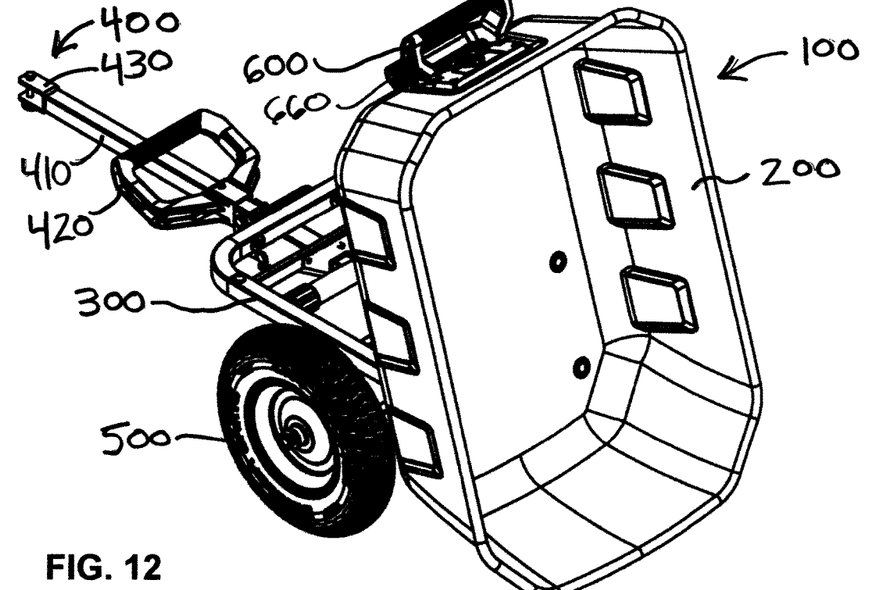
FIG. 12 depicts a second perspective view of an embodiment of the utility trailer in the tow and dump configurations.

As shown in FIGS. 8 and 9, the grip handle 421 is offset from the shaft longitudinal axis 413 so that the handle may be moved by sliding the grip 420 from the shaft first end 411 toward the shaft second end 412. This arrangement allows tongue 430 to be exposed for connection to a towing vehicle (e.g., lawn tractor, quad, etc.). As illustrated in FIGS. 6-9, the tongue 430 may be a clevis to provide stability when used in either configuration. Alternatively, the tongue 430 could have a single branch or could be more than two branches.

In the preferred embodiment, the grip 420 is not removeable from the shaft 410 to prevent loss or misplacement of the grip 420. This may be accomplished by having a stop at the proximal end of the tongue 430 that extends beyond the grip shaft aperture inner perimeter 424). The preferred embodiment has a shaft 410 and a grip shaft aperture 423 with square cross sections to keep the grip 420 aligned with the shaft 410 (as well as the grip attachment pin holes 426 aligned with the tongue attachment pin holes 431. It is contemplated that the shaft 410 and tongue 430 be made of steel to provide the most strength while the grip 420 is made of extruded plastic for light weight and user comfort.

Figure 17:
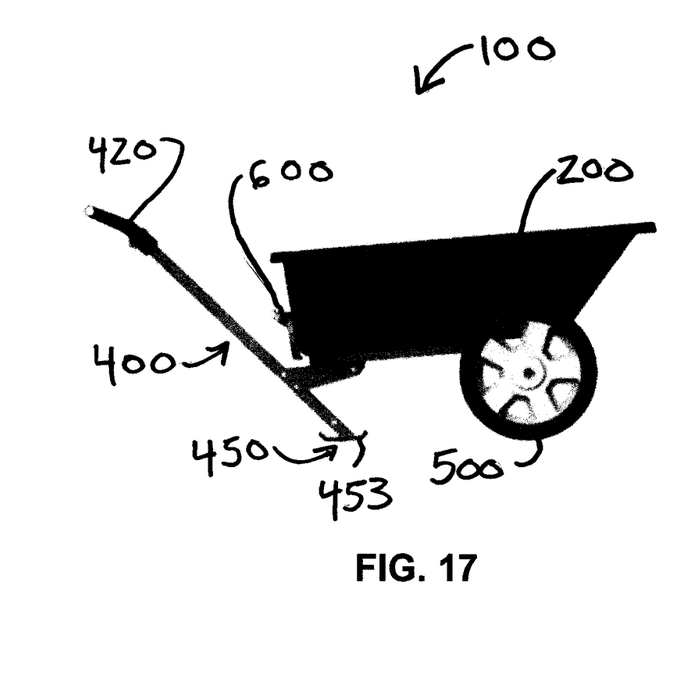
FIG. 17 depicts a right side elevation view of another embodiment of the utility trailer in the pull configuration on the stand.
Figure 18:
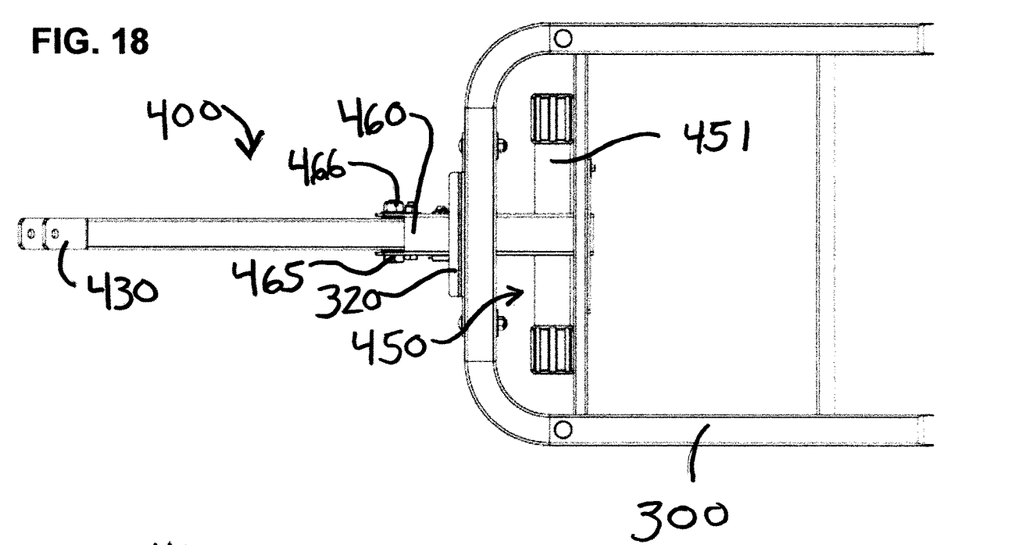
FIG. 18 depicts a top plan view of an embodiment of the utility trailer chassis and arm in the pull configuration without the grip.
Figure 19:
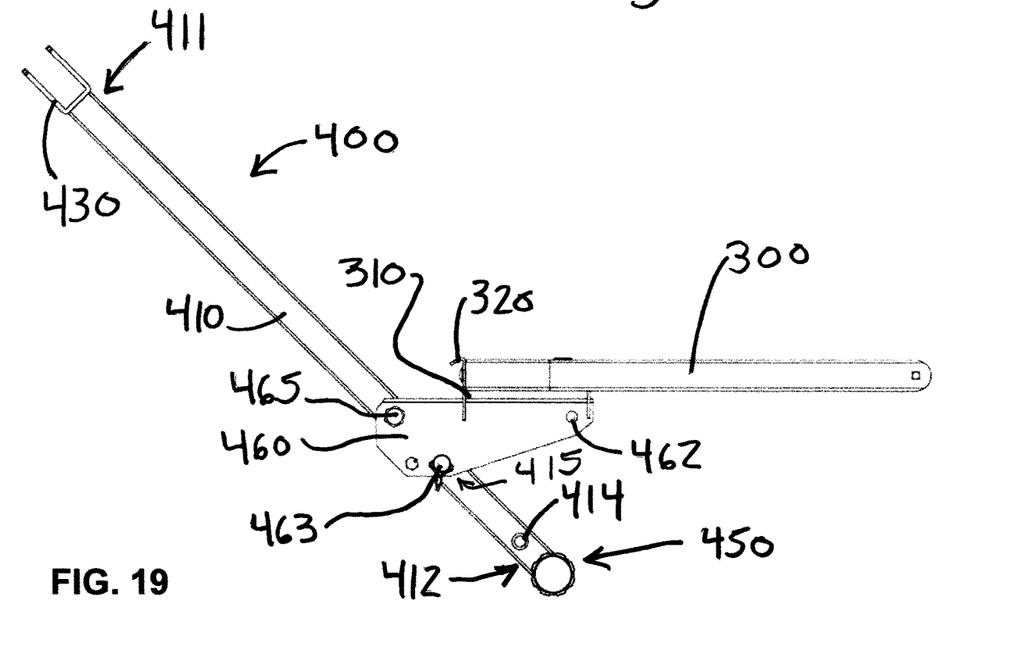
FIG. 19 depicts a right side elevation view of an embodiment of the utility trailer chassis and arm in the pull configuration without the grip.
Figure 20:
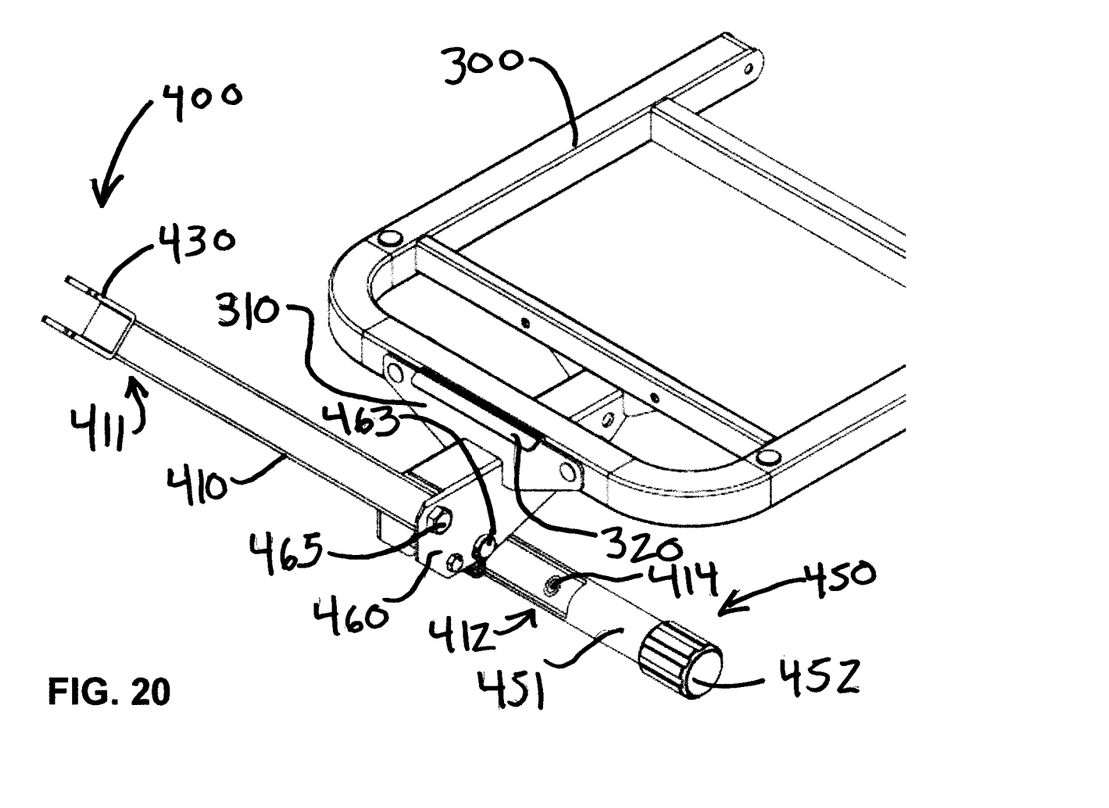
FIG. 20 depicts a perspective view of an embodiment of the utility trailer chassis and arm in the pull configuration without the grip.

The handle 400 further includes a stand 450 at the shaft second end 412 to allow the utility trailer 100 to remain in a predominately horizontal position in a pulling position (see FIG. 17). The stand 450 may be of any configuration that provides an additional point of contact with the ground (in addition to the wheels 500) that will allow the tub 200 of the utility trailer 100 to be in a horizontal position when resting on the stand 450. The embodiment of the stand 450 depicted in FIGS. 1-15 and 18-23 includes a crosstube 451 that is attached to the shaft second end 412 by any means known in the art.

Figure 21:
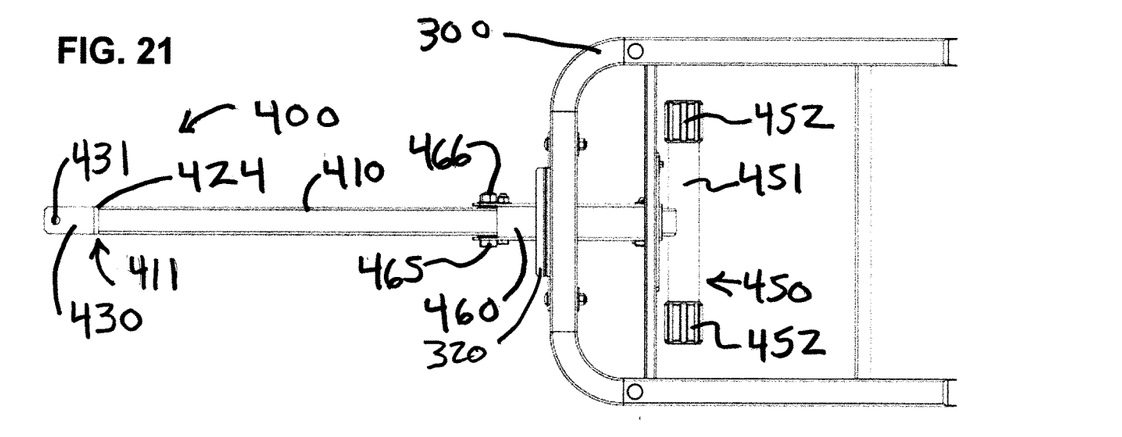
FIG. 21 depicts a top plan view of an embodiment of the utility trailer chassis and arm in the tow configuration without the grip.
Figure 22:
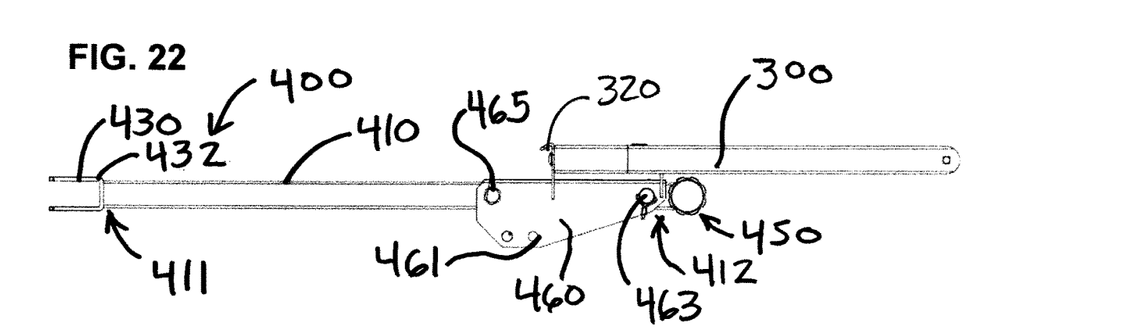
FIG. 22 depicts a right side elevation view of an embodiment of the utility trailer chassis and arm in the tow configuration without the grip.
Figure 23:
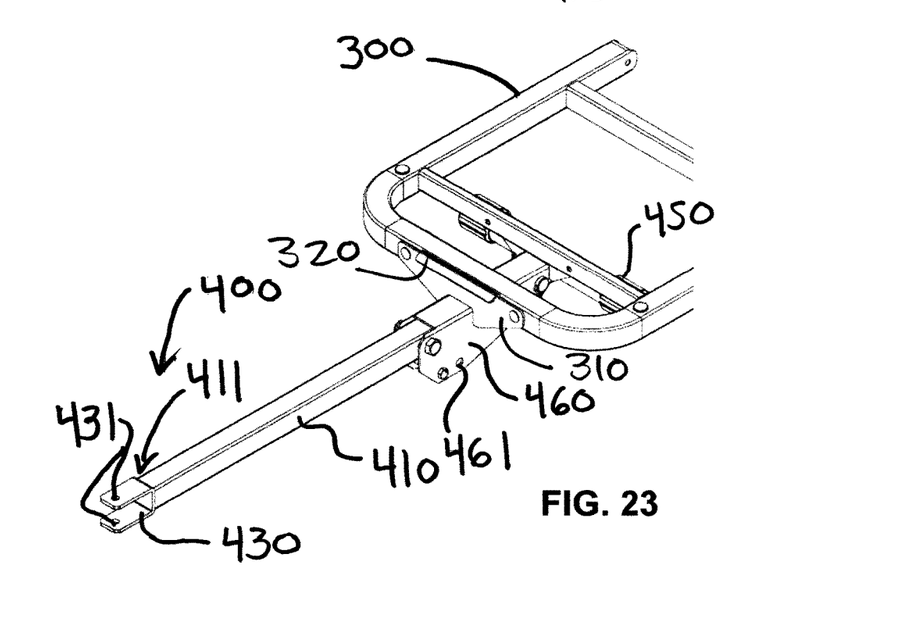
FIG. 23 depicts a perspective view of an embodiment of the utility trailer chassis and arm in the tow configuration without the grip.

The crosstube 451 allows for a wider footprint upon which the utility trailer 100 can rest. The wider the crosstube 451, the more stability it will provide the utility trailer 100. The preferred embodiment has a crosstube 451 that does not extend beyond the chassis 300 width. However, as seen in the embodiment of FIGS. 21-23, the orientation of the crosstube 451 to the chassis 300 would allow the crosstube 451 to be wider than the chassis 300 because in this stored position the crosstube 451 is locked below the chassis 300.

It is preferable that the crosstube 451 is welded to the shaft second end 412 for strength and durability. However, the crosstube 451 may also be connected by a pin (not shown) that would allow the crosstube 451 to be removed and exchanged with another embodiment of a stand 450 such as that depicted in FIGS. 16-17.

The stand 450 depicted in FIGS. 1-15 and 18-23 include feet 452 at the ends of the crosstube 451. Feet 452 provide traction on smooth surfaces and protect the ends of the crosstube 451 from damage and direct contact with soil. Preferably the feet 452 are friction fitted to the crosstube 451, but may be attached with any adhesive or mechanical fastening method known in the art.

Figure 16:
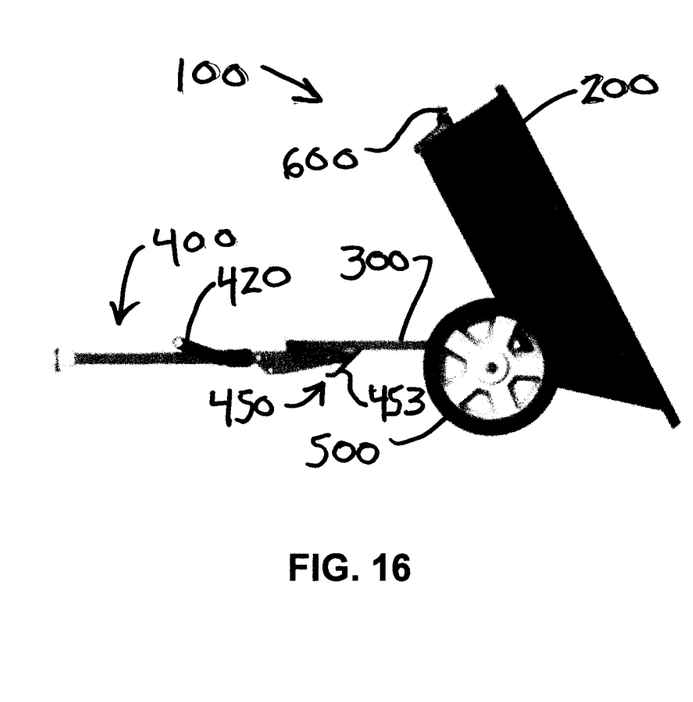
FIG. 16 depicts a right side elevation view of another embodiment of the utility trailer in the tow and dump configurations.

FIGS. 16-17 illustrate an alternative embodiment wherein the stand 450 comprises a flat plate foot 453. As with the crosstube 451, the flat plate foot 453 may be welded to the shaft second end 412 for strength and durability. However, the flat plate foot 453 may also be connected by a pin (not shown) that would allow it to be removed and exchanged with a crosstube 451. As illustrated in FIGS. 16-17, the flat plate foot 453 may ramp or curve upward at its front and rear to prevent the plat plate foot 453 from catching on ground surfaces. The preferred embodiment of the flat plate foot 453 that is permanently fixed to the shaft second end 412 is arranged so that the flat plate foot 453 rests horizontal to the ground surface when the utility trailer 100 is in the standing position (FIG. 17).

To provide stability when the utility trailer 100 is in the towing orientation (FIGS. 6-16 and 21-23) as well as when the utility trail 100 is in the pulling orientation (FIGS. 1-5 and 17-20), a handle bracket 460 connects the handle 400 to the chassis 300. As with the chassis 300 and handle 400, the handle bracket 460 is preferably made of steel for strength and durability. However, the handle bracket 460 can also be made of other metals (aluminum) to lessen the total weight of the utility trailer 100. In the illustrated embodiment, the handle bracket 460 is mounted below the chassis 300 to allow the stand 450 to rest below the chassis 300 when the utility cart 100 is in the towing orientation.

The handle bracket 460 can be mounted to the chassis 300 by any means known in the art, including welding, mechanical attachment, or the handle bracket 460 can be formed as part of the chassis 300. The handle bracket 460 includes a handle connection 465 where the handle 400 connects and pivots on the handle bracket 460. The handle connection 465 can be any means known in the art to pivotably connect to members. In the disclosed embodiment, the handle connection 465 is a bolt that traverses through orifices (not shown) in the handle bracket 460 and handle shaft 410. In this embodiment the bolt 465 is fastened with a respective nut 466.

As best seen in FIGS. 18-23, the handle shaft 410 pivots around the handle connection 465 to allow the handle 400 to be locked in a pulling configuration (FIGS. 18-20) or a towing configuration (FIGS. 21-23). In the illustrated embodiment, the locking of the handle shaft 410 in either configuration is accomplished by the insertion of a handle bracket pin 463 that is installed through one of the bracket pin orifices 461, 462 in the handle bracket 460 that align with shaft pin orifices 414, 415. The handle bracket pin 463 may be any of those common in the art, such as a t-pin, a ball lock pin, a hitch pin with cotter pin, an outrigger pin, or the like. When the handle 400 is in the pulling configuration, the handle bracket pin 463 will be inserted through bracket pin orifice 461 and shaft pin orifice 415. When the handle 400 is in the towing configuration, the handle bracket pin 463 will be inserted through bracket pin orifice 462 and shaft pin orifice 414.

Another feature embodied in the present invention is the selective locking of the tub 200 to the chassis 300 to allow dumping of the utility trailer such as depicted in FIGS. 11-16. Prior art utility trailers typically have the release handle for dumping the trailer located on the chassis of the trailer. This allowed a metal locking mechanism to be welded or otherwise fixed to the metal chassis of the trailer. This arrangement, however, makes it more difficult for a user of the trailer to dump material from the trailer because reaching the release was more difficult and that arrangement did not provide a comfortable or efficient means of dumping the tub 200. The present invention addressed these drawbacks by having a tub locking mechanism 600 mounted to the tub instead of the chassis 300.

The tub locking mechanism 600 includes a handle 610, which functions to both unlock the tub 200 from the chassis 300 as well as control the pivoting of the tub 200 on the chassis 300 to dump a load in the tub 200. In the preferred embodiment, a lock plate 310 is secured to the front of the chassis 300. The lock plate 310 can be made of any suitable material known in the art, but is preferably steel for strength and durability. The lock plate 310 can be secured to the chassis 300 by any methods known in the utility trailer art, such as welding, but the preferred embodiment is bolting the lock plate 310 to the chassis 300 to allow for replacement of the lock plate due to wear or damage. The lock plate 310 includes a lip 320 to which the locking mechanism 600 engages when the tub is in the load carrying orientation (such as FIGS. 1-10).

The tub locking mechanism 600 includes a grip 610 as well as an engagement hook 620 (best seen in FIG. 13) that engages with the lip 320 of the lock plate 310 to secure the front of the tub 200 to the front of the chassis 300. While the dimensions of the engagement hook 620 and the lip 300 can vary in size, the preferred embodiment contemplates both being at least four inches wide to provide a more secure engagement between the two. The grip 610 and hook 620 may be made of any materials known in the art, but in the preferred embodiment, the grip 610 and engagement hook 620 are made of a single plastic body that can be molded or extruded. To provide rigidity and strength to the locking mechanism 600, the locking mechanism 600 is mounted to the tub 200 via an exterior plate 630 and an interior plate 640. The exterior plate 630 and interior plate 640 are preferably sized to fit within an exterior plate cavity 635 and interior plate cavity 645, respectively, formed in the front face of the tub 200. The plates 630, 640 may be made of any material sufficient to provide rigidity to the tub 200 when operating the locking mechanism 600.

The plates 630, 640 are attached to one another through the front face of the tub 200 by any means known in the art. The depicted embodiment uses rivets to fasten the plates 630, 640 so as to prevent bolt heads or nuts from interfering with the interior of the tub 200 and potential injury to the hand of a user grasping the grip 610. The locking mechanism 600 in the disclosed embodiment has a handle 610 that pivots on its mount 660 to allow the engagement hook 620 to rotate from under the engagement lip 320, thus unlocking the tub 200 from the chassis 300 and allowing utility trailer 100 to be put in the dumping configuration. The preferred embodiment also includes biasing the locking mechanism 600 so that the engagement hook 620 is positioned to engage the lip 320 of the lock plate 310. This biasing may be accomplished from the weight of the grip 610 or by using a spring mechanism (not shown) to rotate the locking mechanism 600 into the engaged position.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A utility trailer, comprising:
   a tub;
   a chassis;
   a pair of wheels;
   a handle comprising;
      a shaft having a first end, a second end, a longitudinal axis, an outer perimeter, and a tongue proximate the first end;
      a grip having a handle portion and a hub, the hub having a shaft aperture with a shaft aperture inner perimeter;
      wherein the grip shaft aperture inner perimeter is sized to accommodate the shaft outer perimeter;
      wherein the grip is axially slideable along the shaft longitudinal axis between the shaft first end and shaft second end;
      wherein the handle portion is within a distance of the shaft equal to no more than three times the outer perimeter of the shaft; and
   a stand;
   wherein the handle is shiftable between a towing orientation and a pulling orientation wherein the stand contacts a ground surface upon which the pair of wheels rest when the handle is in the pulling orientation.

2. The utility trailer of claim 1, wherein the grip handle portion is transverse to the shaft longitudinal axis.

3. The utility trailer of claim 2 wherein the grip handle portion is offset from the shaft longitudinal axis.

4. The utility trailer of claim 1 wherein the tongue has an outer perimeter and the grip shaft aperture inner perimeter is sized to accommodate the tongue outer perimeter.

5. The utility trailer of claim 4, wherein the tongue comprises an attachment pin hole and the grip hub comprises an attachment pin hole.

6. The utility trailer of claim 1 wherein the handle comprises an axis and the axis is parallel to the chassis when the handle is in the towing orientation.

7. The utility trailer of claim 6 wherein the handle can be locked in either the towing orientation or the pulling orientation.

8. The utility trailer of claim 7 wherein the stand comprises a crosstube.

9. The utility trailer of claim 7 wherein the stand comprises a flat plate foot.

10. The utility trailer of claim 1 further comprising a handle bracket mounted to the chassis, the handle bracket comprising a handle connection and wherein the handle pivots from the towing orientation and the pulling orientation about the handle connection.

11. The utility trailer of claim 1 further comprising a tub locking mechanism mounted to the tub and a lock plate mounted to the chassis, the tub locking mechanism comprising a grip and an engagement hook and the lock plate comprising a lip;
wherein the engagement hook and lip engage to lock the tub to the chassis.

12. The utility trailer of claim 11 further comprising an interior plate mounted on the interior of the tub and an exterior plate mounted on the exterior of the tub and wherein the tub locking mechanism is connected to the interior plate and the exterior plate.

13. A handle for a utility trailer comprising:
a shaft having a first end, a second end, a longitudinal axis, an outer perimeter, and a tongue proximate the first end;
a grip having a handle portion and a hub, the hub having a shaft aperture with a shaft aperture inner perimeter;
wherein the grip shaft aperture inner perimeter is sized to accommodate the shaft outer perimeter;
wherein the grip is axially slideable along the shaft longitudinal axis between the shaft first end and shaft second end;
wherein the handle portion is within a distance of the shaft equal to no more than three times the outer perimeter of the shaft; and
a stand;
wherein the handle is shiftable between a towing orientation and a pulling orientation and the handle can be locked either the towing orientation or the pulling orientation.

14. The handle for a utility trailer of claim 13 wherein the stand comprises a crosstube.

15. The handle for a utility trailer of claim 14 further comprising a handle bracket, the handle bracket comprising a handle connection and wherein the handle pivots from the towing orientation and the pulling orientation about the handle connection.

16. The handle for a utility trailer of claim 15 wherein the crosstube comprises feet.

17. The handle for a utility trailer of claim 15 wherein the handle is mounted to a chassis of the utility trailer.

18. The handle for a utility trailer of claim 13 wherein the stand comprises a flat plate foot.

19. The handle for a utility trailer of claim 13 further comprising a handle bracket, the handle bracket comprising a handle connection and wherein the handle pivots from the towing orientation and the pulling orientation about the handle connection.

20. A utility trailer, comprising:
a tub;
a chassis;
a pair of wheels;
a handle comprising a grip, a shaft, and a stand; and
wherein the handle is shiftable between a towing orientation and a pulling orientation wherein the grip is axially slideable along the shaft and wherein the stand contacts a ground surface upon which the pair of wheels rest when the handle is in the pulling orientation.

* * * * *